US012673898B2

(12) United States Patent
Werner et al.

(10) Patent No.: US 12,673,898 B2
(45) Date of Patent: Jul. 7, 2026

(54) HYDRAULICALLY-BONDED MULTILAYER PANEL

(71) Applicants: METTEN Consulting GmbH, Overath (DE); Semmelrock International GmbH, Vienna (AT); Birkenmeier GmbH & Co. KG, Breisach-Niederrimsingen (DE)

(72) Inventors: Volkmar Werner, Vienna (AT); Guido Volmer, Erwitte (DE); Michael Metten, Bergisch Gladbach (DE); Felix Birkenmeier, Freiburg (DE); Michael Graf, Emmendingen (DE); Markus Krüger, Hürth (DE)

(73) Assignees: METTEN Consulting GmbH, Overath (DE); Semmelrock International GmbH, Vienna (AT); Birkenmeier GmbH & Co. KG, Breisach-Niederrimsingen (DE)

( * ) Notice: Subject to any disclaimer, the term of this patent is extended or adjusted under 35 U.S.C. 154(b) by 364 days.

(21) Appl. No.: 18/269,994

(22) PCT Filed: Dec. 29, 2020

(86) PCT No.: PCT/EP2020/087994
§ 371 (c)(1),
(2) Date: Jun. 28, 2023

(87) PCT Pub. No.: WO2022/144077
PCT Pub. Date: Jul. 7, 2022

(65) Prior Publication Data
US 2024/0059614 A1 Feb. 22, 2024

(51) Int. Cl.
| | |
|---|---|
| *C04B 28/04* | (2006.01) |
| *B28B 1/16* | (2006.01) |
| *B32B 13/02* | (2006.01) |
| *B32B 13/04* | (2006.01) |
| *C04B 14/06* | (2006.01) |
| *C04B 14/28* | (2006.01) |
| *C04B 24/26* | (2006.01) |
| *C04B 103/32* | (2006.01) |
| *C04B 111/00* | (2006.01) |

(52) U.S. Cl.
CPC .............. *C04B 28/04* (2013.01); *B28B 1/16* (2013.01); *B32B 13/02* (2013.01); *B32B 13/04* (2013.01); *C04B 14/062* (2013.01); *C04B 14/28* (2013.01); *C04B 24/2641* (2013.01); *B32B 2307/54* (2013.01); *B32B 2307/7376* (2023.05); *B32B 2607/00* (2013.01); *C04B 2103/32* (2013.01); *C04B 2111/00612* (2013.01); *C04B 2201/50* (2013.01)

(58) Field of Classification Search
CPC ....... C04B 28/04; C04B 14/062; C04B 14/28; C04B 24/2641; B32B 1/16; B32B 13/02; B32B 13/04

USPC ......................................................... 428/220
See application file for complete search history.

(56) References Cited

U.S. PATENT DOCUMENTS 9,957,196 B1 * 5/2018 Guynn .................... C04B 28/04
2007/0062143 A1 3/2007 Noushad

FOREIGN PATENT DOCUMENTS

| CN | 106554180 A | 4/2017 | |
| CN | 108218377 A | 6/2018 | |
| CN | 108546045 A * | 9/2018 | ............. C04B 28/04 |
| CN | 110028293 A | 7/2019 | |

(Continued)

OTHER PUBLICATIONS

Machine_English_translation_CN_108546045_A; Fan et. al.; Mortar Material for pavement brick surface layer, pavement brick and preparation method of mortar material; Sep. 18, 2018; EPO; whole document (Year: 2025).*

(Continued)

*Primary Examiner* — Tahseen Khan
(74) *Attorney, Agent, or Firm* — The Webb Law Firm

(57) ABSTRACT

The invention relates to a method for producing a hydraulically-bonded multilayer panel with at least one face layer and at least one core layer, wherein the method comprises the following steps
   a. introducing a flowable face mixture into a mold. The face mixture contains at least the following components
   i. face paste containing at least
   1. hydraulic binder and
   2. water; and
   ii. aggregate. The aggregate has a mean diameter d50 determined according to ISO 13320:2009 and/or according to EN 12620 of greater than 100.0 µm; whereby a face mixture layer is formed;
   b. introducing a dry to earth-moist core mixture into the mold, wherein the core mixture contains at least the following components
   i. core paste containing at least
   1. hydraulic binder,
   2. fines, wherein the fines have a mean diameter d50 determined according to ISO 13320:2009 of up to 100.0 µm, and
   3. water; and
   ii. aggregate, wherein the aggregate has a mean diameter d50 determined according to ISO 13320:2009 and/or according to EN 12620 of greater than 100.0 µm; whereby a core mixture layer is formed, and
   c. pressing the face mixture layer with the core mixture layer into the mold to form a hydraulically-bonded, directly strippable multilayer panel with at least one face layer and at least one core layer, wherein water contained in the face mixture layer is partially or completely pressed into the core mixture layer.

42 Claims, No Drawings

(56)     References Cited

FOREIGN PATENT DOCUMENTS

| CN | 111003989 | A  | 4/2020 |
| CN | 111517726 | A  | 8/2020 |
| EP | 1108825   | A2 | 6/2001 |
| EP | 2543649   | A1 | 1/2013 |

OTHER PUBLICATIONS

Anonymous: "Concrete slab", Wikipedia, Oct. 3, 2020 (Oct. 3, 2020), pp. 1-2, XP093272335, Found on the Internet: URL:https://de.wikipedia.org/w/index.php?title=Betonplatte&oldid=204200901.

* cited by examiner

HYDRAULICALLY-BONDED MULTILAYER PANEL

CROSS REFERENCE TO RELATED APPLICATION

This application is the United States national phase of International Application No. PCT/EP2020/087994 filed Dec. 29, 2020, the disclosure of which is hereby incorporated by reference in its entirety.

BACKGROUND OF THE INVENTION

Field of the Invention

The invention relates to a method for producing a hydraulically-bonded multilayer panel with at least one face layer and at least one core layer and to a multilayer panel produced with the method.

Description of Related Art

Multilayer panels of the type mentioned at the outset are known in principle and are used, for example, as floor covering, inter alia for outdoor applications, such as gardens and terraces.

Basic requirements for panels made of concrete are regulated in EN 1339 and the national application standards, DIN EN 1339 or ÖNORM EN 1339. Accordingly, with respect to the load-bearing capacity, a certain bending tensile strength or a minimum breaking load ascertained during the bending tensile test is required. Large-size products in particular generally have to meet a minimum requirement, for the characteristic bending tensile strength, of at least 5.0 MPa and, for the characteristic breaking load, of at least 7 kN. It should be noted in this respect that the strength values actually to be required depend greatly upon the actual panel size and that particular load states must be taken into account in particular in the case of lengths >600 mm. The dimensions of the panels according to EN 1339 are limited. They are as follows: (1) minimum thickness of panels according to ÖNORM EN 1339: 4 cm±1 mm; (2) total length: ≤1 m; and (3) ratio of total length to thickness: >4.

In addition to the requirements for the load-bearing capacity, requirements for the durability must be fulfilled. The finished products should have very good weather resistance (weathering according to DIN EN 1338/DIN EN 1339<50 g/m²) and/or sufficient abrasion resistance (abrasion according to DIN EN 1338/1339<20 mm).

In addition, there are requirements with regard to the restriction of the deformation (concave deformation of the panels <2.0 mm) as a result of creep, shrinkage, and thermal deformation. The panel must be optimized in terms of porosity and capillarity such that it has a high resistance to contamination (no capillary suction and/or very low water absorption <1.0% according to DIN EN 1338/1339).

Floor panels that fulfill the aforementioned minimum requirements can be produced with different production techniques. These techniques, inter alia, include the casting process, wet pressing process, vibration pressing process, forging processes, and the hermetic process.

According to the current state of the art, the economic production of multilayer panels according to the hermetic process is possible. The hermetic process is usually used to produce two-layer terrace panels and pavement slabs, as well as large-size, high-quality, and high-density panels for public places and buildings. It is also possible to produce thin, single-layer panels for indoors and the building cladding by the hermetic process.

The visible, upward- or outward-directed layer is referred to as a face layer and the non-visible, downward- or inward-directed layer as a core layer or backfilling layer. Both the face layer and the core layer must fulfill requirements from the manufacturing process. The face layer is first produced to be flowable so that, after filling, it fills the corners of the formwork and can already level by itself somewhat. The leveling can be supported by vibration or pressing of face distribution panels. In contrast, the core layer is generally produced to be dry to earth-moist and is usually applied to the face layer by means of a filling funnel and a slide in the most homogeneous layer thickness possible. In the production process, the pressing of both layers, in which excess water is pressed out of the face layer into the core layer and strong compaction is also carried out, results in an immediately strippable, stable multilayer panel which can be removed by means of vacuum lifting devices and stored on pallets.

Products produced according to the hermetic process are characterized by a particular surface quality which is well suited for further processing by means of grinding, brushing, and blasting. In addition, an immediately strippable, stable, and storable product can be produced with the hermetic process.

According to the current state of the art, floor panels can be manufactured from 30 mm thickness to 400 mm edge length, and from 40 mm thickness with edge lengths of up to 800 mm by means of hermetic processes. However, large-size, thin multilayer panels which have a larger edge-length-to-thickness ratio cannot be produced or cannot be satisfactorily produced with the previous production techniques. In particular, the mechanical properties and thus the usability of such large-size, thin multilayer panels are frequently not satisfactory.

It is therefore an object of the invention to provide an improved method with which, in particular, large-size, thin, directly strippable multilayer panels can also be produced.

SUMMARY OF THE INVENTION

The aforementioned object is achieved by a method for producing a hydraulically-bonded multilayer panel with at least one face layer and at least one core layer, wherein the method comprises the following steps:

a. introducing a flowable face mixture into a mold, wherein the face mixture contains at least the following components:

i. face paste containing at least 1. hydraulic binder and 2. water; and ii. aggregate, wherein the aggregate has a mean diameter d50 determined according to ISO 13320:2009 and/or according to EN 12620 of greater than 100.0 μm;

whereby a face mixture layer is formed;

b. introducing a dry to earth-moist core mixture into the mold, wherein the core mixture contains at least the following components:

i. core paste containing at least 1. hydraulic binder, 2. fines, wherein the fines have a mean diameter d50 determined according to ISO 13320:2009 of up to 100.0 μm, and 3. water; and ii. aggregate, wherein the aggregate has a mean diameter d50 determined according to ISO 13320:2009 and/or according to EN 12620 of greater than 100.0 µm;

whereby a core mixture layer is formed, and c. pressing the face mixture layer with the core mixture layer into the mold to form a hydraulically-bonded, directly strippable multilayer panel with at least one face layer and at least one core layer, wherein water contained in the face mixture layer is partially or completely pressed into the core mixture layer.

In the sense of the invention, the term, "directly strippable", is in particular understood to mean that the multilayer panel can be removed from the mold immediately or shortly after the pressing, e.g., by means of vacuum lifting, and/or has a strength which enables further processing and storage without formwork.

With the method according to the invention, a multilayer panel can be produced which can have an edge-length-to-thickness ratio of more than 20 and is nevertheless characterized by a high characteristic bending tensile strength and/or a high characteristic breaking load. The advantages of the production method according to the invention arise in particular in the case of large-size products. In particular, it is possible with the method according to the invention to produce multilayer panels with edge lengths of more than 800 mm and/or thicknesses of less than 40 mm, and in particular thicknesses of 25 to 35 mm. Surprisingly, it has been found that multilayer panels produced according to the method according to the invention have a high load-bearing capacity and usability despite the larger edge-length-to-thickness ratio and are outstandingly suitable for use as floor covering, and in particular for outdoor applications.

In order to produce a large-size multilayer panel which fulfills all minimum requirements for floor coverings, conventional pressing processes use core mixture layers in which a voids content remains after the pressing, the degree of compaction therefore being below the value 1.0. A degree of compaction of less than 1.0 is necessary for good pressing of the water from the face mixture layer into the core mixture layer. A high degree of compaction would cause excess water to arise at the edge of the panels after the pressing process. In the case of a high degree of compaction in the core mixture layer, there is also the risk that the excess water from the face mixture layer cannot penetrate as far as the underside of the core mixture layer. As a result, layers with different water content can form in the core mixture layer, which would lead to an uneven or incomplete activation of the hydraulic binder in the core mixture layer and to a deterioration in the mechanical properties of the multilayer panel.

In addition, core mixtures having a high fines content and low water content can lead to problems in the mixing process, such as inadequate dispersion of the fines constituents, lumping, and dust development. In addition, an insufficiently mixed core concrete can be problematic with regard to compactibility and the later hardened concrete properties.

The present invention now provides a production method in which the face and core mixture layers interact optimally in order to produce a multilayer panel with an optimized packing density and an optimized water demand.

Without being bound to a particular theory, the interaction of the fines contained in the core paste with the aggregate contained in the core paste appears to be essential for the method according to the invention. Instead of cavity water, fines having a mean diameter d50 that is less than the mean diameter d50 of the hydraulic binder fill the interstices of the binder particles. Fines having a binder-like mean diameter d50 do not fill the interstices, but nevertheless have a lower water demand than the binder. Fines having a mean diameter d50 that is higher than the diameter d50 of the hydraulic binder, but at most 100 µm, and aggregate having a mean diameter d50 that is higher than 100 µm, presumably reduce the density of the mixture when excess water is pressed out of the face mixture layer, which facilitates the pressing of the water out of the face mixture layer into the core mixture layer.

Contrary to expectations, the fines fraction in the core paste mixture does not impair sufficient pressing of the excess water from the face mixture layer into the core mixture layer. Rather, the core mixture used in the method according to the invention has an optimal water-to-powder ratio, which enables outstanding processability of the core mixture as well as strength and resistance of the multilayer panels.

Core Mixture

The core mixture contains at least the following components:

i. core paste containing at least 1. hydraulic binder, 2. fines, wherein the fines have a mean diameter d50 determined according to ISO 13320:2009 of up to 100.0 µm, and 3. water; and ii. aggregate, wherein the aggregate has a mean diameter d50 determined according to ISO 13320:2009 and/or according to EN 12620 of greater than 100.0 µm.

By introducing the core mixture into the mold, a core mixture layer is formed.

When being introduced into the mold, the core mixture has a dry to earth-moist consistency. When being introduced into the mold, the core mixture preferably has a consistency of at most consistency class F1 according to DIN 1045-2 and/or EN 206. According to DIN 1045-2, the consistency class F1 has a slump of ≤340 mm and a stiff consistency, whereas the higher consistency classes F2 through F6 have a greater slump and softer, or more flowable, consistencies. A preferred embodiment of the invention provides that, prior to pressing according to step c., the core mixture layer have a consistency of at most consistency class F1 according to DIN 1045-2 and/or EN 206.

The core mixture layer is formed by introducing a dry to earth-moist core mixture into a mold, wherein the core mixture contains at least core paste and aggregate. According to a preferred embodiment of the invention, the core mixture contains, relative to the total dry weight of the core mixture, at least 450 kg/m$^3$, in particular 450 to 1,250 kg/m$^3$, and further preferably 600 to 1,250 kg/m$^3$, core paste.

Fines

According to the invention, the core paste contains fines. Fines in the sense of the invention are substances that have a mean diameter d50 determined according to ISO 13320:2009 of up to 100.0 µm. The term, "mean diameter," in the sense of this invention is always to be understood to mean the mean diameter d50 determined according to ISO 13320:2009.

According to the invention, the core paste can contain fines having a mean diameter of 1.0 to 100.0 µm. In a preferred embodiment, the core paste contains fines having a mean diameter d50 determined according to ISO 13320:2009 of 1.0 to 100.0 µm in an amount of 5 to 45 vol %, relative to the total volume of hydraulic binder and fines contained in the core paste.

An advantageous development provides that the core paste contain fines having a mean diameter d50, determined according to ISO 13320:2009, that is less than the mean diameter d50 determined according to ISO 13320:2009 of the hydraulic binder contained in the core paste. Instead of so-called cavity water, these fines fill the interstices of the hydraulic binder particles, whereby a higher packing density and a reduced water demand can be achieved. In addition, such fines can replace part of the hydraulic binder, which, in the case of a cement replacement, can lead to a reduced clinker content with a lower efflorescence potential.

According to a preferred embodiment of the invention, the core paste contains fines having a mean diameter that is less than the mean diameter of the hydraulic binder in an amount of 5 to 45 vol %, relative to the total volume of hydraulic binder and fines contained in the core paste. In a further embodiment, the core paste contains fines having a mean diameter that is less than the mean diameter of the hydraulic binder in an amount of 5 to 45 vol %, relative to the total volume of the hydraulic binder and the fines of the core paste.

Particularly preferably, the fines contained in the core paste have a mean diameter d50 determined according to ISO 13320:2009 of 1.0 to 30.0 μm, and preferably of 1.0 to 5.0 μm. In a preferred embodiment, the core paste contains fines having a mean diameter d50 determined according to ISO 13320:2009 of 1.0 to 30.0 μm in an amount of 5 to 45 vol %, relative to the total volume of hydraulic binder and fines contained in the core paste. Particularly preferably, the core paste contains fines having a mean diameter d50 determined according to ISO 13320:2009 of 1.0 to 5.0 μm in an amount of 5 to 20 vol %, and in particular of 8 to 15 vol %, relative to the total volume of hydraulic binder and fines contained in the core paste.

It has also been found to be advantageous if the core paste contains fines having a mean diameter d50 determined according to ISO 13320:2009 of 30.1 to 100.0 μm in an amount of 0 to 45 vol %, and in particular of 0 to 25 vol %, relative to the total volume of hydraulic binder and fines contained in the core paste. In a preferred embodiment, the core paste has fines having a mean diameter of 30.1 to 100.0 μm in an amount of 0 vol %.

According to the invention, the fines can be rock granules, and in particular rock granules based upon quartz and/or limestone.

An advantageous development provides that the fines contain at least one inert rock flour—preferably an inert rock flour selected from the group consisting of limestone, dolomite, and quartz, or a combination thereof. In one embodiment, the core paste contains inert rock flour fines in an amount of 5 to 45 vol %, and in particular 20 to 45 vol %, relative to the total volume of hydraulic binder and fines contained in the core paste.

Furthermore, it is preferably provided that the fines contain at least one hydraulically-active substance. In one embodiment, the fines contain at least one hydraulically-active, synthetically-produced substance and/or one hydraulically-active, natural substance. The fines preferably contain at least one hydraulically-active substance selected from the group consisting of granulated slag, microsilica, and fly ash, or a combination thereof. In a particularly preferred embodiment of the invention, the fines contain microsilica. Particularly preferably, the fines consist of a hydraulically-active substance, and in particular of microsilica. Particularly preferably, the core paste contains hydraulically-active fines, and in particular microsilica, in an amount of 5 to 20 vol %, and in particular of 8 to 15 vol %, relative to the total volume of hydraulic binder and fines contained in the core paste.

In a preferred embodiment, the fines contain (a) inert rock flour selected from the group consisting of limestone flour, dolomite flour, and quartz, or a combination thereof, in an amount of 10 to 25 vol %, relative to the total volume of hydraulic binder and fines contained in the core paste, and (b) a hydraulically-active substance selected from the group consisting of granulated slag, microsilica, and fly ash, or a combination thereof, in an amount of 8 to 15 vol %, relative to the total volume of hydraulic binder and fines contained in the core paste.

In a particularly preferred embodiment, the fines consist of (a) inert rock flour selected from the group consisting of limestone flour, dolomite flour, and quartz, or a combination thereof, in an amount of 10 to 25 vol %, relative to the total volume of hydraulic binder and fines contained in the core paste, and (b) a hydraulically-active substance selected from the group consisting of granulated slag, microsilica, and fly ash, or a combination thereof (in particular, microsilica) in an amount of 8 to 15 vol %, relative to the total volume of hydraulic binder and fines contained in the core paste.

Hydraulic Binder

In the sense of this invention, the term, "hydraulic binder," is understood to mean any binders that, with addition of water and, where applicable, further constituents form strength-increasing hydrate phases. It is preferably provided that the hydraulic binder in step a. and/or step b. be selected from the group consisting of cement, hydraulically-active additives, latent hydraulic or pozzolanic additives, siliceous binders, or a combination thereof.

In the sense of this invention, the term, "hydraulic binder," is also understood to mean geopolymer binders. In particular, slag-based geopolymer binder, rock-based geopolymer binder, fly ash-based geopolymer binder (i.e., alkali-activated fly ash and/or slag/fly ash-based), aluminum silicate binder (alkali-activated aluminum silicates), and also ferro-sialate-based geopolymer binder are suitable as geopolymer binder. Such geopolymer binders are in principle known and familiar to the person skilled in the art. Geopolymer binders can be used either as the sole hydraulic binder or in combination with other hydraulic binders, and in particular in combination with cement.

It is furthermore preferably provided that the hydraulic binder in step a. and/or step b. be selected from the group consisting of cement, fly ash, microsilica, granulated slag, natural or artificial pozzolanas, geopolymers, metakaolin, calcined clays, or a combination thereof.

According to a particularly preferred embodiment of the invention, the hydraulic binder in step a. and/or step b. is cement. The cement can be selected from the group consisting of the CEM I and CEM II/A classes according to EN 197-1, or a combination thereof.

It is advantageous if the core paste contains at least 350 $kg/m^3$, in particular 350 to 1,000 $kg/m^3$, and in particular 500 to 1,000 $kg/m^3$, of hydraulic binder, relative to the total dry weight of the core mixture. It is furthermore preferably provided that the core paste contains hydraulic binder, and in particular cement, in an amount of 60 to 95 vol %, and in particular of 65 to 80 vol %, relative to the total volume of hydraulic binder and fines contained in the core paste.

According to the invention, the face paste contains at least hydraulic binder and water. It is preferably provided that the face paste contains 350 to 1,000 $kg/m^3$, and in particular 500 to 1,000 $kg/m^3$, of hydraulic binder, relative to the total dry weight of the face mixture.

The face paste and the core paste may contain the same or different hydraulic binders. In a preferred embodiment of the invention, the face paste and the core paste contain the same hydraulic binder. In a particularly preferred embodiment, the hydraulic binder of the face paste and of the core paste is cement, and in particular a cement selected from the group consisting of the CEM I and CEM II/A classes according to EN 197-1, or a combination thereof.

An advantageous development of the method according to the invention provides that the face paste contains hydraulic binder, and in particular cement, in an amount of to 91 wt %, and in particular of 50 to 70 wt %, relative to the total dry weight of the face paste.

Aggregate

The core mixture furthermore contains aggregate having a mean diameter d50 determined according to ISO 13320: 2009 and/or according to EN 12620 of greater than 100.0 μm. The aggregate preferably has a mean diameter that is greater than the mean diameter of the hydraulic binder. This has the advantage that the aggregate improves the compactibility of the core mixture when excess water is pressed out of the face mixture layer and/or facilitates the pressing of the water out of the face mixture layer into the core mixture layer.

According to a preferred embodiment of the method according to the invention, it is provided that the aggregate contained in the core mixture be a mixture containing organic and/or inorganic substances, wherein the organic and/or inorganic substances are optionally selected from the group consisting of coarse rock flours, mineral aggregate including rock granules according to EN 12620, ceramic, glass, synthetic fibers, natural fibers, and biological constituents—in particular, grass—or a combination thereof. It is furthermore preferably provided that the aggregate contained in the core mixture be rock granules according to EN 12620, and preferably rock granules according to EN 12620 based upon quartz, basalt, granite, lime, lime grit, or mixtures thereof. It is furthermore preferred that the aggregate contained in the core mixture and/or face mixture be rock granules according to EN 12620 that have a mean diameter of 0.101 mm to 5.000 mm, in particular of 0.125 mm to 5.000 mm, and preferably 0.250 mm to 5.000 mm.

According to a preferred embodiment of the invention, the aggregate used is a mixture that is optimized in its composition by means of methods for determining the optimal grading curve, such that a minimal cavity for aggregate mixtures with a smallest grain is greater than the mean diameter d50 determined according to ISO 13320: 2009 of the hydraulic binder.

Water Binder Mean Value

In one embodiment, prior to pressing according to step c., the core mixture introduced into the mold has a water binder mean value (W/B) of 0.10 to 0.40, and preferably 0.12 to 0.20, based upon the ratio of water to the sum of hydraulic binder and fines having a mean diameter of 1.0 to 100.0 μm, and in particular of 1.0 to 30.0 μm.

Too low a water content can negatively influence the later strength. The W/B value in the core concrete should therefore not be too low after pressing. It is accordingly preferred that, after pressing according to step c., the core mixture introduced into the mold have a water binder mean value of 0.20 to 0.45, and preferably of 0.21 to 0.28, based upon the ratio of water to the sum of hydraulic binder and fines having a mean diameter d50 determined according to ISO 13320: 2009 of 1.0 to 100.0 μm, and in particular of 1.0 to 30.0 μm. In a particularly preferred embodiment, after pressing according to step c., the core mixture introduced into the mold has a water binder mean value of 0.22 to 0.24.

The method according to the invention provides that water be pressed out of the face mixture layer into the core mixture layer. As a result, the W/B value of the face mixture layer is generally lower after pressing than prior to pressing. Conversely, the W/B value of the core mixture layer is generally higher after pressing than prior to pressing. It is furthermore provided that, prior to pressing according to step c., the core mixture introduced into the mold have a water binder mean value that is equal to or lower than the water binder mean value of the face mixture introduced into the mold, prior to pressing according to step c.

In a particular embodiment, prior to pressing according to step c., the core mixture introduced into the mold has a water binder mean value that deviates 15% or less from the face mixture introduced into the mold, prior to pressing according to step c), based upon the water binder mean value of the face mixture introduced into the mold, prior to pressing according to step c). This embodiment is in particular advantageous if a UHPC concrete (ultra high performance concrete) is used as a face layer.

Paste Saturation Degree

According to a preferred embodiment of the invention, the core mixture used in step b. is characterized by a relatively high paste saturation degree (LSG). The LSG is a measure of the degree of filling, predetermined by the rock granules, of the cavity with binder paste. It can be calculated using the following formula (1):

$$LSG = \frac{V_L}{V_{G,H,p}} \qquad (1)$$

LSG paste saturation degree [−]

$V_L$ paste volume (fraction of water and fines <100 μm per m$^3$ of concrete) [m$^3$/m$^3$]

$V_{G,H,p}$ voids content of the aggregate mixture >100 μm in the pressed state [m$^3$/m$^3$]

$V_{G,H,p}$ can be calculated as follows:

$$V_{G,H,p} = \frac{V_{G,p} - V_{G,id}}{V_{G,p}}$$

$V_{G,H,p}$ voids content of the aggregate mixture >100 μm in the pressed state [m$^3$/m$^3$]

$V_{G,p}$ measured volume of the aggregate mixture >100 μm in the pressed state [m$^3$]

$V_{G,id}$ idealized volume of the aggregate mixture >100 um without taking into account the air volume [m$^3$]

The pressing test with the hermetic press for determining the voids content $V_{G,p}$ can be performed as follows:

Rock granules amount >100 μm is filled into a press mold (e.g., laboratory hermetic press) and distributed as uniformly as possible by means of a steel ruler or the like.

The amount of rock granules introduced is thereafter pressed at 20 MPa for 10 s.

Subsequently, the distance h$_i$ between the upper edge of the mold and the upper edge of the panels is measured at each of the 4 corners of the press mold. The actual volume of the pressed panel $V_{G,p}$ is then ascertained.

$$V_{G,p} = \frac{\sum h_i - 4 \cdot h}{4 \cdot l \cdot b}$$

h . . . overall height of the mold (e.g., for laboratory hermetic press) [mm]

$h_i$ . . . distance between the upper edge of the mold and the upper edge of the pressed panels, measured in all 4 corners [mm]

b . . . width of the mold (e.g., for laboratory hermetic press) [mm]

l . . . length of the mold (e.g., for laboratory hermetic press) [mm]

The idealized volume of the aggregate mixture >100 um without taking into account the air volume [m$^3$] ($V_{G,id}$) can be calculated as follows:

$$V_{G,id} = \sum \frac{m_i}{\rho_i}$$

$m_i$ . . . mass of the individual rock granules fractions for an idealized panel [kg]

$p_i$ . . . bulk density of the individual rock granules fractions [kg/mg$^3$]

Theoretically, an LSG of 1 would be an ideal state in which a maximum packing density is present. However, this maximum packing density is generally not achieved in practice, since, in addition to a fraction of air pores, which can be assumed to be 1.0 to 1.5 vol %, the degree of compaction or the compactibility plays an important role. A distinct increase in the strength of the multilayer panel in the hardened state can be achieved by increasing the LSG of the core mixture. However, an increase in LSG to values of over 1.1 is disadvantageous for conventional core mixtures, since this can lead to a reduction in the bending tensile strength of the multilayer panel. It has now been found that the method according to the invention enables a further increase in the characteristic bending tensile strength, and specifically up to an LSG of the core mixture of approximately 1.5. As a result, a higher strength can be achieved than was possible in the case of known multilayer panels.

In a preferred embodiment, the amount of core paste contained in the core mixture is calculated such that a paste saturation degree for the core mixture, calculated according to formula (1), is 1.0 to 1.5, and preferably 1.1 to 1.4.

Paste Layer Thickness

A further advantage of the invention is that a high degree of compaction and/or a high packing density can already be achieved at a low paste layer thickness (LSD) of the core paste layer. The term, "paste layer thickness" (LSD), is understood to mean the computational LSD, which results after pressing according to formula (2):

$$LSD = \frac{V_L - V_{G,H,p}}{S_G \cdot m_g} \cdot 10^{-6} \quad (2)$$

LSD . . . paste layer thickness [μm]

$V_L$ . . . paste volume (volume of fines fractions (largest grain <100 μm) and water) [m$^3$/m$^3$]

$V_{G,H,p}$ voids content of the rock granules mixture >100 μm in the pressed state [m$^3$/m$^3$]

$m_g$ . . . mass of the rock granules mixture >100 μm per m$^3$ concrete [kg/m$^3$]

$S_G$ . . . specific surface area of the rock granules >100 μm [m$^2$/kg$^3$]

In the calculation of the specific surface area of the rock granules $S_G$, the grain shape of the rock granules (grain shape factor) and the grading curves of the rock granules are taken into account.

In a preferred embodiment, the amount of core paste contained in the core mixture is calculated such that a paste layer thickness, calculated according to formula 2, for the core paste layer is at most 30.0 μm, and in particular at most 20.0 μm or 3.0 to 20.0 μm.

Face Mixture

The face mixture used in step a. of the method according to the invention contains at least the following components:

i. face paste containing at least
1. hydraulic binder, and
2. water; and ii. aggregate, wherein the aggregate has a mean diameter d50 determined according to ISO 13320:2009 and/or according to EN 12620 of greater than 100.0 μm.

It is essential that the face mixture have a soft to flowable consistency. In a preferred embodiment, prior to pressing according to step c., the face mixture layer has a consistency of at least consistency class F5 according to DIN 1045-2 and/or EN 206, and in particular a consistency according to one of the consistency classes F5 or F6.

According to a preferred embodiment of the invention, it is further provided that the face mixture contains 450 to 1,250 kg/m$^3$, and in particular 600 to 1,250 kg/m$^3$, face paste, relative to the total dry weight of the face mixture.

It is not absolutely necessary for the face paste to contain fines. It is, however, preferred that the face paste contain, as a further component, fines, and in particular fines having a mean diameter d50 determined according to ISO 13320: 2009 of up to 100.0 μm.

According to a preferred embodiment of the invention, the face paste contains fines having a mean diameter of 1.0 to 100.0 μm in an amount of 5 to 50 wt %, preferably of 15 to 45 wt %, and in particular of 20 to 45 wt %, relative to the total dry weight of the face paste.

An advantageous development further provides that the face paste contain fines having a mean diameter d50, determined according to ISO 13320:2009, that is less than the mean diameter d50 determined according to ISO 13320: 2009 of the hydraulic binder, and, specifically, preferably in an amount of 5 to 50 wt %, more preferably 15 to 45 wt %, and most preferably 20 to 45 wt %, relative to the total dry weight of the face paste.

It is furthermore preferably provided that the face paste contains fines having a mean diameter d50 determined according to ISO 13320:2009 of 1.0 to 30.0 μm, in particular 1.0 to 5.0 μm, and, specifically, in particular in an amount of 5 to 50 wt %, preferably of 15 to 45 wt %, and in particular 20 to 45 wt %, relative to the total dry weight of the face paste.

In a further embodiment of the invention, the face paste contains inert rock flour as fines.

Further preferably, the face paste contains hydraulically-active fines, and in particular microsilica, in an amount of 5 to 20 vol %, and in particular of 8 to 15 vol %, relative to the total volume of hydraulic binder and fines contained in the face paste.

The face mixture used in step a. of the method according to the invention furthermore contains an aggregate. The aggregate suitable for the core mixture is basically also suitable for the face mixture. The aggregate in the face mixture has a mean diameter that is greater than the mean diameter of the hydraulic binder, and in particular greater than 100.0 μm. In a preferred embodiment of the invention, the aggregate contained in the face mixture has a mean diameter of 0.101 mm to 5.000 mm, and in particular of 0.125 mm to 5.000 mm or 0.250 mm to 5.000 mm.

According to a preferred embodiment of the invention, it is further provided that the aggregate contained in the face mixture be rock granules, and in particular rock granules based upon quartz, basalt, granite, lime, lime grit, or mixtures thereof. It is furthermore advantageous if the aggregate contained in the face mixture is rock granules having a mean diameter of 0.101 mm to 5.000 mm, and in particular of 0.125 mm to 5.000 mm or 0.250 mm to 5.000 mm.

It is furthermore advantageous if the aggregate is a mixture containing organic and/or inorganic substances, wherein the organic and/or inorganic substances are optionally selected from the group consisting of coarse rock flours, mineral aggregate including rock granules according to EN 12620, ceramic, glass, synthetic fibers, natural fibers, and biological constituents—in particular, grass—or a combination thereof.

According to a particularly preferred embodiment, the aggregate is a mixture that is optimized in its composition by means of methods for determining the optimal grading curve, such that a minimal cavity for aggregate mixtures with a smallest grain is greater than the mean diameter d50 determined according to ISO 13320:2009 of the hydraulic binder.

The face mixture preferably contains at least the following components:
  i. face paste containing at least
  1. hydraulic binder,
  2. fines, wherein the fines have a mean diameter d50 determined according to ISO 13320:2009 of at most 100.0 μm, and
  3. water; and
  ii. aggregate, wherein the aggregate has a mean diameter d50 determined according to ISO 13320:2009 and/or according to EN 12620 that is greater than 100.0 μm.

With respect to the ingredients of the face mixture, and in particular with respect to hydraulic binder, fines, aggregate, and admixture, what is specified above, and in particular what is specified above in connection with the core mixture, applies accordingly unless otherwise specified.

According to a preferred embodiment of the method according to the invention, prior to pressing according to step c., the face mixture introduced into the mold has a water binder mean value (W/B) of at most 0.60, preferably at most 0.40, and preferably of 0.20 to 0.40, based upon the ratio of water to the sum of hydraulic binder and fines having a mean diameter of 1.0 to 100.0 μm, and in particular of 1.0 to 30 μm.

DESCRIPTION OF THE INVENTION

The steps a. and b. of the method according to the invention can be carried out in the specified order (first step a., thereafter step b.) or in reverse order (first step b, thereafter step a.). In the former case, the dry to earth-moist core mixture is applied in the mold to the already formed flowable face mixture layer. This is the normal case. However, it is also possible, although less preferred, to first introduce the dry to earth-moist core mixture into the mold and to then apply the flowable face concrete mixture to the core mixture layer.

Both the core mixture and the face mixture can moreover contain one or more admixtures according to EN 934. The use of suitable admixtures which, on the one hand, already cause better dispersion and wetting of hydraulic binder, and in particular cement, and additives during the mixing process and, on the other hand, can reduce the frictional forces between the fines constituents, can have a positive effect on the processing and compactibility.

In a preferred embodiment, the core mixture and/or the face mixture contains, as a further component, 0.01 to 3.0 wt % admixture according to EN 934, relative to the total dry weight of the hydraulic binder. The admixture is preferably selected from the group consisting of concrete plasticizers, superplasticizers, stabilizers, air entraining agents, accelerators, retarders, shrinkage reducers, and sealants, or a combination thereof. The core mixture and/or the face mixture preferably contains, as a further component, 0.01 to 3.0 wt %, relative to the total dry weight of the hydraulic binder, superplasticizer. The superplasticizer is preferably selected from the group consisting of surface-active substances—in particular, naphthalene sulfonates and/or lignosulfonates—and dispersing substances—in particular, melamine resins, polycarboxylates, and polycarboxylate ethers, or a combination thereof. According to a particularly preferred embodiment, a polycarboxylate, polyaryl ether, or polycarboxylate ether is used as the superplasticizer.

During pressing according to step c. of the method according to the invention, water contained in the face mixture layer is partially pressed into the core mixture layer. According to a preferred embodiment of the invention, the pressure during pressing according to step c. is at least 0.5 N/mm², in particular at least 10 N/mm², and preferably at least 15 N/mm². Preferably, the pressing according to step c. takes place with a pressing time of 5 to 60 seconds, and in particular of 5 to 40 seconds or 5 to 15 seconds.

The pressing according to step c. can take place in one pressing process or in at least two successive pressing processes at the same or different intensity. Preferably, the pressing is provided in one pressing process. According to a particularly preferred embodiment of the invention, the pressing takes place according to step c. in a hermetic press.

Hydraulically-Bonded Multilayer Panels

According to a further embodiment, the invention relates to a hydraulically-bonded multilayer panel which can be or is produced according to the method according to the invention.

The hydraulically-bonded multilayer panel according to the invention can have any dimensions. The multilayer panel of the invention is preferably a relatively large-size, hydraulically-bonded multilayer panel, e.g., a multilayer panel having a length of at least 300, 400, 500, 600, 700, or 800 mm. In a particularly preferred embodiment, the hydraulically-bonded multilayer panel according to the invention has a length of 800 to 1,200 mm.

The hydraulically-bonded multilayer panel according to the invention can have all customary surface dimensions and is not limited to large-size multilayer panels. However, the advantages of the invention emerge particularly clearly in the production of large-size multilayer panels. Preferably, the hydraulically-bonded multilayer panel according to the invention has a surface area of at least 0.16 m², and in particular of 0.18 to 1.44 m², 0.32 to 1.44 m², 0.18 to 0.83 m², or 0.32 to 0.83 m². Particularly preferred is a hydraulically-bonded multilayer panel having a surface area of 0.32 to 1.44 m².

The hydraulically-bonded multilayer panel according to the invention is not limited in its thickness and can be of any thickness. However, the advantages of the invention emerge particularly clearly in the production of relatively thin multilayer panels. Accordingly, a hydraulically-bonded multilayer panel having a thickness of at most 40.0 mm, and in particular of 15.0 to 40.0 mm, is preferred.

The hydraulically-bonded multilayer panel according to the invention furthermore has a relatively high degree of compaction. The degree of compaction (VG) is to be understood as the ratio between the calculated maximum bulk density of the mixture of an idealized panel without air and the measured bulk density of the produced panel after the pressing process. The degree of compaction is calculated in particular according to formula (3):

$$VG = \frac{\rho_{FB,id}}{\rho_{FB}} \quad (3)$$

$V_G$ . . . degree of compaction [–]

$\rho_{FB,id}$ calculated, theoretically maximum, bulk density of the mixture in the fresh state (without air) [kg/m$^3$]

$\rho_{FB}$ . . . measured bulk density of the panel after the pressing process [kg/m$^3$]

In a preferred embodiment, the core mixture layer has a degree of compaction determined according to formula (3) of 0.93 to 0.99, and in particular of 0.97 to 0.99.

The hydraulically-bonded multilayer panel according to the invention is further characterized by a relatively high packing density of the core mixture layer. The term, "packing density," is understood to mean the packing density of all solids of the core layer mixture in the pressed state. The packing density can in particular be calculated as follows:

$$PD_p = \frac{V_{F,id}}{V_p} \quad (4)$$

$PD_p$ . . . packing density of all solids of the core layer mixture in the pressed state [–]

$V_{F,id}$ . . . idealized volume of all solids of the core layer mixture without taking into account the air volume [m$^3$]

$V_p$ . . . measured volume of the core layer mixture of the pressed panels without water [m$^3$]

In a preferred embodiment, the core mixture layer has a packing density determined according to formula (4) of 0.75 to 0.85, and in particular of 0.78 and 0.83.

Furthermore, it is advantageous that the hydraulically-bonded multilayer panel has a characteristic bending tensile strength ascertained according to DIN EN 1339, after 7 days of hardening, of more than 7.5 N/mm$^2$, in particular of at least 8.5 N/mm$^2$, and particularly preferably at least 10.0 N/mm$^2$.

The invention is explained in more detail below with reference to exemplary embodiments.

EXAMPLES

A. Core Paste and Face Paste

Various compositions for core paste and face paste have been developed and tested. For this purpose, the water demand at the saturation point ($V_{w,s}/V_p$) and the water binder mean value at the saturation point ($w_s/p$) were ascertained.

1. Core Paste

|  | Core paste solids | vol % | $V_{w,s}/V_p$ | $w_s/b$ |
|---|---|---|---|---|
| Comparative example 1 | CEM I 52.5 N | 100 | 0.84 | 0.27 |
| Comparative example 2 | CEM I 42.5 R | 100 | 0.88 | 0.28 |
| Comparative Example 3 | CEM I 52.5 R | 100 | 0.94 | 0.30 |
| Example 1 | CEM I 52.5 N | 66 | 0.53 | 0.23 |
|  | Quartz flour | 22 |  |  |
|  | Microsilica | 12 |  |  |
| Example 2 | CEM I 42.5 R | 66 | 0.54 | 0.24 |
|  | Quartz flour | 22 |  |  |
|  | Microsilica | 12 |  |  |
| Example 3a | CEM I 52.5 R | 91 | 0.77 | 0.26 |
|  | Microsilica | 9 |  |  |
| Example 3b | CEM I 52.5 R | 60 | 0.57 | 0.28 |
|  | Dolomite flour | 40 |  |  |

2. Face Paste

|  | Face paste solids | vol % | $V_{w,s}/V_p$ | $w_s/b$ |
|---|---|---|---|---|
| Comparative example 4 | CEM I 52.5 R | 100 | 0.94 | 0.30 |
| Example 4 | CEM I 52.5 R | 60 | 0.70 | 0.41 |
|  | Dolomite stone flour | 40 |  |  |

$V_{w,s}/V_p$ means water demand of the powder (or of the fines in the sense of the invention) at the saturation point. For this purpose, the method according to Marquardt I., described in *Marquardt I: Ein Mischungskonzept für selbstverdichtenden Beton auf der Basis der Volumenkenngrölößen and Wasseransprüche der Ausgangsstoffe [Mixture concept for self-compacting concrete based upon volume parameters and water demands of the starting materials], dissertation,* University of Rostock, 2001, is adopted and adapted to the present application. For this purpose, a particular amount of the dry powder was introduced into a mixer which is able to detect changes in the mixing energy input or its power consumption. Then, water was mixed in continuously at constant rotational speed, and the amount of added water was measured continuously with the aid of a flow meter. The peak level of the power consumption of the mixer, which corresponds to the maximum shear resistance, shows when the saturation point is reached. The mixture is "earth-moist."

The water content in the mixture can be specified at any time i, usually as "volumetric water-to-powder ratio" ($V_{w,i}/V_p$). At the saturation point, this corresponds to the water demand at the saturation point ($V_{w,s}/V_p$).

$w_s/b$ means water binder mean value at the saturation point and refers to the ratio of water to the sum of hydraulic binder and fines in the sense of the invention.

A lower $V_{w,s}/V_p$ or $w_s/b$ value indicates a lower voids content or a higher packing density. By filling the cavity between the binder particles, which would otherwise have to be filled with cavity water, a reduced water requirement arises in order to achieve comparable compactibility and strength.

The above-described paste solids compositions are particularly suitable for use in the production method according to the invention. Specifically, the core paste compositions according to the invention give the core mixture layer of the multilayer panel outstanding compactibility and strength, with a reduced water requirement. The inventive face paste compositions give the face layer of the multilayer panel outstanding processability, strength, and durability.

B. Production of a Multilayer Panel

From the above-specified face and core mixtures, a multilayer panel was produced as follows:

Example 5

Face Mixture 166.9 kg/m³ CEM I 42.5 R, kg/m³ 241 CEM I 52.5 N were mixed with 137.1 kg/m³ dolomite flour 0.0-0.3 mm, 161.8 kg/m³ fine quartz sand 0.0-0.5 mm F12, 529.2 kg/m³ fine granite sand (0.1-1.0 mm), 147.3 kg/m³ limestone grit (0.1-0.6 mm), 219.4 kg/m³ limestone grit (0.6-1.2 mm), and 361.5 kg/m³ limestone grit (1.5-3.0 mm) in an Eirich mixer 8 L (5 L effective volume) for 60 seconds at 200 rpm. Thereafter, 31.2 kg/m³ limestone flour (0.5-3.0 μm; d50=1.2 μm) and 31.2 kg/m³ mineral plasticizer (1.0-25 μm; d50=4.5 μm) were added and mixed for 120 seconds at 200 rpm. Subsequently, 270.8 kg/m³ water and 3.77 kg/m³ superplasticizer based upon polycarboxylate ether were added and mixed for 120 seconds at 200 rpm. Finally, the entire mixture was mixed for 120 seconds at 200 rpm. The face mixture obtained in this way had a slump after 7 minutes of 345 mm, which corresponds to a flowable consistency.

Core Mixture 779.9 kg/m³ cement CEM I 42.5 R was mixed with 251.3 kg/m³ quartz flour (100-200 μm), 703.6 kg/m³ fine limestone sand (0.3-0.8 mm), and 310.2 kg/m³ basalt 1-3 mm in an Eirich mixer 8 L (5 L effective volume) for 60 sec at 150 rpm. Thereafter, 126.09 kg/m³ water and 3.86 superplasticizer based upon polycarboxylate ether were added and mixed for 60 sec at 150 rpm. Subsequently, 218.4 kg/m³ quartz flour (2.0-100.0 μm; d50=15 μm) and 101.4 kg/m³ RW quartz flour (2.0-100.0 μm; d50=5 μm) were added and mixed for 120 sec at 150 rpm. Finally, 14.01 kg/m³ water were added and mixed for 60 sec at 150 rpm. A flowable core mixture was obtained.

Introduction and Pressing

The prepared flowable face mixture was introduced into an 800 mm 400 mm large hermetic press mold of the OCEM laboratory sliding table press type 100 and distributed as uniformly as possible in the mold. The layer thickness of the face mixture after introduction into the mold (i.e., the thickness of the face mixture layer) was approximately 6 mm. Subsequently, the prepared earth-moist core mixture was applied to the face mixture layer by means of a filling funnel and a slide in the most homogeneous layer thickness possible (approximately 29 mm). The core mixture layer and the face mixture layer were compressed in the hermetic press at a pressure of approximately 15.0 MPa for approximately 10 seconds. The multilayer panel obtained was stripped directly after pressing.

The W/B value of the core mixture layer was 0.159; the W/B value of the face mixture layer was 0.664.

After pressing, the core mixture layer had a layer thickness of 24 mm, and the face mixture layer had a layer thickness of 6 mm. The total thickness of the multilayer panel obtained was 30 mm. Despite its relatively small thickness, the multilayer panel had a characteristic bending tensile strength, ascertained according to DIN EN 1339, after 7 days of hardening, of 10.9 N/mm² and was characterized by excellent load-bearing capacity and outstanding usability.

The invention claimed is:

1. A method for producing a hydraulically-bonded multilayer panel with at least one face layer and at least one core layer, wherein the method comprises the following steps:

a. introducing a flowable face mixture into a mold, wherein the face mixture contains at least the following components:
  i. face paste containing at least
  1. hydraulic binder and
  2. water; and
  ii. aggregate, wherein the aggregate has a mean diameter d50 determined according to ISO 13320:2009 and/or according to EN 12620 of greater than 100.0 μm;
  whereby a face mixture layer is formed;
b. introducing a dry to earth-moist core mixture into the mold, wherein the core mixture contains at least the following components:
  i. core paste containing at least
  1. hydraulic binder,
  2. fines having a mean diameter d50 determined according to ISO 13320:2009 of
  1.0 to 30.0 μm, in particular 1.0 to 5.0 μm, and fines having a mean diameter d50 according to ISO 13320:2009 of 30.1 to 100.0 μm in an amount of 0 to 45 vol %, relative to the total volume of hydraulic binder and fines contained in the core paste, and
  3. water; and
  ii. aggregate, wherein the aggregate has a mean diameter d50 determined according to ISO 13320:2009 and/or according to EN 12620 of greater than 100.0 μm;
  whereby a core mixture layer is formed, and
c. pressing the face mixture layer with the core mixture layer into the mold to form a hydraulically-bonded, directly strippable multilayer panel with at least one face layer and at least one core layer, wherein water contained in the face mixture layer is partially or completely pressed into the core mixture layer.

2. The method according to claim 1, wherein the core paste contains fines having a mean diameter d50 determined according to ISO 13320:2009 of 1.0 to 100.0 μm in an amount of 5 to 45 vol %, relative to the total volume of hydraulic binder and fines contained in the core paste.

3. The method according to claim 1, wherein the core paste contains fines having a mean diameter d50, determined according to ISO 13320:2009, that is less than the mean diameter d50 determined according to ISO 13320:2009 of the hydraulic binder contained in the core paste.

4. The method according to claim 1, wherein the core paste contains fines having a mean diameter d50 determined according to ISO 13320:2009 of 30.1 to 100.0 μm in an amount of 0 to 25 vol %, relative to the total volume of hydraulic binder and fines contained in the core paste.

5. The method according to claim 1, wherein the core paste contains fines having a mean diameter d50 determined according to ISO 13320:2009 of 1.0 to 30.0 μm in an amount of 5 to 45 vol %, relative to the total volume of hydraulic binder and fines contained in the core paste.

6. The method according to claim 1, wherein the core paste contains fines having a mean diameter d50 determined according to ISO 13320:2009 of 1.0 to 5.0 μm in an amount of 5 to 20 vol %, and in particular of 8 to 15 vol %, relative to the total volume of hydraulic binder and fines contained in the core paste.

7. The method according to claim 1, wherein the face paste contains, as a further component, fines, and in particular fines having a mean diameter d50 determined according to ISO 13320:2009 of up to 100.0 μm.

8. The method according to claim 1, wherein the face paste contains fines having a mean diameter d50, determined according to ISO 13320:2009, that is less than the mean diameter d50 determined according to ISO 13320:2009 of the hydraulic binder.

9. The method according to claim 1, wherein the face paste contains fines having a mean diameter d50 determined according to ISO 13320:2009 of 1.0 to 30.0 μm, and in particular 1.0 to 5.0 μm.

10. The method according to claim 1, wherein the fines in step a. and/or step b. contain at least one inert rock flour-preferably an inert rock flour selected from the group consisting of limestone, dolomite, and quartz, or a combination thereof.

11. The method according to claim 1, wherein the fines in step a. and/or b. contain at least one hydraulically-active substance, and in particular a hydraulically-active, natural, or synthetically-produced substance.

12. The method according to claim 11, wherein the hydraulically-active substance is selected from the group consisting of granulated slag, microsilica, and fly ash, or a combination thereof.

13. The method according to claim 1, wherein the core paste contains 350 to 1,000 kg/m$^3$, and in particular 500 to 1,000 kg/m$^3$, of hydraulic binder, relative to the total dry weight of the core mixture.

14. The method according to claim 1, wherein the face paste contains 350 to 1,000 kg/m$^3$, and in particular 500 to 1,000 kg/m$^3$, of hydraulic binder, relative to the total dry weight of the face mixture.

15. The method according to claim 1, wherein the hydraulic binder in step a. and/or step b. is selected from the group consisting of cement, hydraulically-active additives, latent hydraulic or pozzolanic additives, siliceous binders, or a combination thereof.

16. The method according to claim 1, wherein the hydraulic binder in step a. and/or step b. is selected from the group consisting of cement, fly ash, microsilica, granulated slag, natural or artificial pozzolanas, geopolymers, metakaolin, calcined clays, or a combination thereof.

17. The method according to claim 1, wherein the hydraulic binder in step a. and/or step b. is cement, and in particular a cement selected from the group consisting of the CEM I and CEM II/A classes according to EN 197-1, or a combination thereof.

18. The method according to claim 1, wherein the core paste contains hydraulic binder—in particular, cement—in an amount of 60 to 95 vol %, and in particular of 65 to 80 vol %, relative to the total volume of hydraulic binder and fines contained in the core paste.

19. The method according to claim 1, wherein the core mixture contains 450 to 1,250 kg/m$^3$, and in particular 600 to 1,250 kg/m$^3$, of core paste, relative to the total dry weight of the core mixture.

20. The method according to claim 1, wherein the amount of core paste contained in the core mixture is calculated such that a paste saturation degree for the core mixture, calculated according to formula 1 specified in the description, is 1.0 to 1.5, and in particular 1.1 to 1.4.

21. The method according to claim 1, wherein the amount of core paste contained in the core mixture is calculated such that a paste layer thickness, calculated according to formula 2 specified in the description, for the core paste layer is at most 30.0 μm, and in particular at most 20.0 μm or 3.0 to 20.0 μm.

22. The method according to claim 1, wherein the face mixture contains 450 to 1,250 kg/m$^3$, and in particular 600 to 1,250 kg/m$^3$, of face paste, relative to the total dry weight of the face mixture.

23. The method according to claim 1, wherein, prior to pressing according to step c., the core mixture introduced into the mold has a water binder mean value (W/B) of 0.10 to 0.40, and preferably 0.12 to 0.20, based upon the ratio of water to the sum of hydraulic binder and fines having a mean diameter d50 determined according to ISO 13320:2009 of 1.0 to 100.0 μm, and in particular of 1.0 to 30.0 μm.

24. The method according to claim 1, wherein, after pressing according to step c., the core mixture introduced into the mold has a water binder mean value of 0.20 to 0.45, and in particular of 0.21 to 0.28 or 0.22 to 0.24, based upon the ratio of water to the sum of hydraulic binder and fines having a mean diameter d50 determined according to ISO 13320:2009 of 1.0 to 100.0 μm, and in particular of 1.0 to 30.0 μm.

25. The method according to claim 1, wherein, after pressing according to step c., the face mixture layer has a consistency of at least consistency class F5 according to DIN 1045-2 and/or EN 206.

26. The method according to claim 1, wherein, prior to pressing according to step c., the core mixture layer has a consistency of at most consistency class F1 according to DIN 1045-2 and/or EN 206.

27. The method according to claim 1, wherein the core mixture and/or the face mixture contains, as a further constituent, 0.01 to 3.0 wt %, relative to the total dry weight of the hydraulic binder, admixture according to EN 934, wherein the admixture is optionally selected from the group consisting of concrete plasticizers, superplasticizers, stabilizers, air entraining agents, accelerators, retarders, and sealants, or a combination thereof.

28. The method according to claim 27, wherein the admixture according to EN 934 is a superplasticizer, and in particular a superplasticizer selected from the group consisting of surface-active substances, in particular naphthalene sulfonates and/or lignosulfonates, and dispersing substances, in particular melamine resins, polycarboxylates, and polycarboxylate ethers, or a combination thereof, and in particular polycarboxylate, polyacrylic ether, and polycarboxylate ethers.

29. The method according to claim 1, wherein the aggregate contained in the core mixture and/or face mixture is a mixture containing organic and/or inorganic substances, wherein the organic and/or inorganic substances are optionally selected from the group consisting of coarse rock flours, mineral aggregate including rock granules according to EN 12620, ceramic, glass, synthetic fibers, natural fibers, and biological constituents—in particular, grass—or a combination thereof.

30. The method according to claim 1, wherein the aggregate and/or fines contained in the core mixture and/or the face mixture are rock granules according to EN 12620.

31. The method according to claim 30, wherein the aggregate and/or fines contained in the core mixture and/or the face mixture are rock granules according to EN 12620 based upon quartz, basalt, granite, lime, lime grit, or mixtures thereof.

32. The method according to claim 30, wherein the aggregate contained in the core mixture and/or face mixture is rock granules according to EN 12620 that have a mean diameter d50 determined according to ISO 13320:2009 of 0.101 mm to 5.000 mm, and in particular of 0.125 mm to 5.000 mm.

33. The method according to claim 1, wherein the aggregate contained in the core mixture and/or face mixture is a mixture that is optimized in its composition by means of methods for determining the optimal grading curve, such that a minimal cavity for aggregate mixtures with a smallest grain is greater than the mean diameter d50 determined according to ISO 13320:2009 of the hydraulic binder.

34. The method according to claim 1, wherein introducing the core mixture into the mold according to step b. takes place by applying the core mixture to the flowable face mixture layer formed according to step a.

35. The method according to claim 1, wherein the pressure during pressing according to step c. is at least 0.5 N/mm$^2$, and in particular at least 10 N/mm$^2$ or at least 15 N/mm$^2$.

36. The method according to claim 1, wherein the pressing according to step c. takes place with a pressing time of 5 to 60 seconds, and in particular of 5 to 40 seconds or 5 to 15 seconds.

37. The method according to claim 1, wherein the pressing according to step c. takes place in at least two successive pressing processes at the same or different intensity.

38. A hydraulically-bonded multilayer panel producible by a method according to claim 1, wherein the core mixture layer has a degree of compaction, determined according to the formula 3 specified in the description, of 0.93 to 0.99, and in particular of 0.97 to 0.99 and/or wherein the core mixture layer has a packing density, determined according to the formula 4 specified in the description, of 0.75 to 0.85, and in particular of 0.78 to 0.83.

39. The hydraulically-bonded multilayer panel according to claim 38, wherein the hydraulically-bonded multilayer panel has a length of at least 300, 400, 500, 600, 700, or 800 mm, and in particular of 800 to 1,200 mm.

40. The hydraulically-bonded multilayer panel according to claim 38, wherein the hydraulically-bonded multilayer panel has a surface area of at least 0.16 m$^2$, and in particular of 0.18 to 1.44 m 2, 0.32 to 1.44 m$^2$, 0.18 to 0.83 m$^2$, or 0.32 to 0.83 m$^2$.

41. The hydraulically-bonded multilayer panel according to claim 38, wherein the hydraulically-bonded multilayer panel has a thickness of at most 40.0 mm, and in particular of 15.0 to 40.0 mm.

42. The hydraulically-bonded multilayer panel according to claim 38, wherein the multilayer panel has a characteristic bending tensile strength, ascertained according to DIN EN 1339, after 7 days of hardening, of more than 7.5 N/mm$^2$, and in particular of at least 8.5 N/mm$^2$.

\* \* \* \* \*